(12) United States Patent
Kristiansen et al.

(10) Patent No.: US 12,704,827 B2
(45) Date of Patent: Aug. 11, 2026

(54) PLANNING METHOD FOR PROCESSING A 2D ELEMENT INTO A 3D FINAL ELEMENT

(71) Applicant: AALBORG UNIVERSITET, Aalborg Øst (DK)

(72) Inventors: Morten Kristiansen, Støvring (DK); Ewa Kristiansen, Støvring (DK); Anders Noel Thomsen, Aalborg (DK); Benny Ørtoft Endelt, Dronninglund (DK); Anders Faarbaek Mikkelstrup, Aalborg (DK); Georgi Nikolaev Nikolov, Aalborg (DK)

(73) Assignee: AALBORG UNIVERSITET, Aalborg Øst (DK)

( * ) Notice: Subject to any disclaimer, the term of this patent is extended or adjusted under 35 U.S.C. 154(b) by 470 days.

(21) Appl. No.: 18/003,836

(22) PCT Filed: Jul. 2, 2021

(86) PCT No.: PCT/DK2021/050223

§ 371 (c)(1),
(2) Date: Dec. 29, 2022

(87) PCT Pub. No.: WO2022/002339

PCT Pub. Date: Jan. 6, 2022

(65) Prior Publication Data

US 2024/0027991 A1 Jan. 25, 2024

(30) Foreign Application Priority Data

Jul. 2, 2020 (DK) .......................... PA 2020 70454

(51) Int. Cl.
*G05B 19/4097* (2006.01)

(52) U.S. Cl.
CPC .................... *G05B 19/4097* (2013.01); *G05B 2219/45154* (2013.01)

(58) Field of Classification Search
CPC ...... G05B 19/4097; G05B 2219/45154; G05B 19/4099; B21D 5/00; Y02P 90/02; A61C 7/002; A61C 7/08
See application file for complete search history.

(56) References Cited

U.S. PATENT DOCUMENTS 5,505,365 A 4/1996 Olsen
5,910,894 A 6/1999 Pryor
(Continued)

FOREIGN PATENT DOCUMENTS

CN 102009323 A 4/2011
JP H04-143026 A 5/1992
(Continued)

OTHER PUBLICATIONS

Lazarus, N., Smith, G.L. and Dickey, M.D., 2019. Selfâfolding metal origami. Advanced Intelligent Systems, 1(7), p. 1900059. (Year: 2019).*

(Continued)

*Primary Examiner* — Alicia M. Choi
(74) *Attorney, Agent, or Firm* — BakerHostetler

(57) ABSTRACT

The present invention relates to a computer-implemented method for planning laser processing of one or more elements into one or more final elements, such as planning a process of creating a final element from a sheet metal by creating a model of both the sheet metal to be processed and the final element and determining a plurality of processing steps to create said final element. The method is based on a plurality of rules for taking into account, how to process the element by a plurality of processing steps, said processing steps comprising laser process specifications and generating at least a first set of instructions for an associated laser processing device.

16 Claims, 10 Drawing Sheets

(56) References Cited

U.S. PATENT DOCUMENTS

| | | | | |
|---|---|---|---|---|
| 6,026,351 | A | 2/2000 | Takeuchi | |
| 6,350,326 | B1 | 2/2002 | Mccay et al. | |
| 8,414,264 | B2 | 4/2013 | Bolms | |
| 10,882,252 | B2 * | 1/2021 | Garrett | B33Y 50/00 |
| 2004/0019402 | A1 * | 1/2004 | Bourne | B21D 5/02 700/165 |
| 2005/0257589 | A1 * | 11/2005 | Durney | E04C 2/08 72/324 |
| 2006/0079989 | A1 | 4/2006 | Ishii et al. | |
| 2006/0196853 | A1 | 9/2006 | Elmer et al. | |
| 2009/0100894 | A1 * | 4/2009 | Durney | B21D 11/10 72/379.2 |
| 2011/0059330 | A1 * | 3/2011 | Durney | B21D 35/00 428/596 |
| 2013/0090755 | A1 | 4/2013 | Kiryu et al. | |
| 2013/0103183 | A1 | 4/2013 | Mochida | |
| 2014/0251962 | A1 | 9/2014 | Alfille | |
| 2014/0302340 | A1 | 10/2014 | Heusel | |
| 2015/0083710 | A1 | 3/2015 | Albrecht et al. | |
| 2018/0126670 | A1 * | 5/2018 | DehghanNiri | B29C 64/386 |
| 2018/0173209 | A1 * | 6/2018 | Iseli | G01B 21/04 |
| 2019/0196449 | A1 * | 6/2019 | Zhang | B33Y 50/00 |
| 2020/0047281 | A1 * | 2/2020 | Lazarus | B23K 26/0006 |
| 2021/0206068 | A1 * | 7/2021 | Hertling | B29C 64/153 |
| 2021/0339391 | A1 | 11/2021 | Seibert | |
| 2022/0063991 | A1 * | 3/2022 | Hu | B81C 1/00007 |
| 2023/0271276 | A1 | 8/2023 | Steinlin et al. | |

FOREIGN PATENT DOCUMENTS

| | | | |
|---|---|---|---|
| JP | H06114443 | A | 4/1994 |
| JP | 2001277058 | A | 10/2001 |
| WO | WO 1993/016839 | A1 | 4/1996 |

OTHER PUBLICATIONS

Hao, Y. and Lien, J.M., Jun. 2019. Computational laser forming origami of convex surfaces. In Proceedings of the 3rd Annual ACM Symposium on Computational Fabrication (pp. 1-11). (Year: 2019).*

Ko, W.H., Srinivasa, A. and Kumar, P.R., Dec. 2017. A multi-component automated laser-origami system for cyber-manufacturing. In IOP Conference Series: Materials Science and Engineering (vol. 272, No. 1, p. 012013). IOP Publishing. (Year: 2017).*

International Patent Application No. PCT/DK2021/050222; Int'l Search Report and Written Opinion; dated Oct. 7, 2021; 16 pages.

Ko et al.; "A Multi-Component Automated Laser-Origami System for Cyber-Manufacturing"; IOP Conf. Series: Materials Science and Engineering; vol. 272; Jan. 2017; 10 pages.

Iquebal et al.; "Towards Realizing Cybermanufacturing Kiosks: Quality Assurance Challenges and Opportunities"; Procedia Manufacturing; vol. 26; Jan. 2018; p. 1296-1306.

Umapathi et al.; "LaserStacker: Fabricating 3D Objects by Laser Cutting and Welding"; ACM User Interface Software and Technology; Nov. 2015; p. 575-582.

Zheng et al.; "Joinery: Parametric Joint Generation for Laser Cut Assemblies"; Session: The Art and Science of Making—ACM Creative and Cognition; Jun. 2017; p. 63-74.

Thomsen et al.; "Online measurement of the surface during laser forming"; The Int'l Journal of Advanced Manufacturing Technology; vol. 107; 2020; p. 1569-1579.

Lazarus et al.; "Self-folding Metal Origami: A Review"; Advanced Intelligent Systems; vol. 1 No. 7; Nov. 2019; 80 pages.

W. M. Steen et al.; "Laser Material Processing—4$^{th}$ edition"; Laser Bending or Forming; 9.1 to 9.6; © 2010; p. 389-416.

"Flexible Laser Cell—FLC"; https://www.weil-technology.com/prod exible-laser-solutions/flexible-laser-cell-llc/; Weil Engineering GmbH; 2018; accessed Sep. 17, 2018; 4 pages.

Jenn Brady; "Army lab's laser forming origami is a game changer for Soldiers, developing countries"; https://www.arl.army.mil/www.default.cfm?article=3131; Dec. 2017; accessed Sep. 17, 2018; 2 pages.

"Bend-Laser Combination—Lasbend AJ"; http://www.amada.pl/en/bend-laser-combination/lasbend/laser-bendingcombination.html; Amada GmbH; © 2018; 2 pages.

International Patent Application No. PCT/DK2021/050223; Int'l Search Report and Written Opinion; dated Oct. 8, 2021; 14 pages.

Hao et al.; "Computational Laser Forming Origami of Convex Surfaces"; ACM Symposium on Computational Fabrication; Jun. 2019; 11 pages.

Klemens, A visit to Amada's home, downloaded from https://www.ffjournal.neUindustry-news/58-manufacturing/11842-a-visit-to-amadas-home, 2013, 12 pages.

Lazarus et al., Laser Forming for Complex 3D Folding, downloaded from https://advanced.onlinelibrary.wiley.com/doi/full/10.1002/admt.201700109, 2017, pp. 1-6.

Mueller et al., LaserOrigami: Laser-Cutting 3D Objects, downloaded from https://dl.acm.org/doi/10.1145/2470654.2481358, 2013, pp. 2585-2592.

Peterson et al., High quality laser cutting in aluminum, downloaded from chrome-extension://efaidnbm nnnibpcajpcglclefind mkaj/https://projekter.aau .dk/projekter/files/65217820/Speciale_projekt. pdf, 2012, 129 pages.

Shen et al, "Modelling of laser forming—An review", 2009, pp. 834-840, downloaded from https://www.sciencedirect.com/ science/article/pii/S0927025609001888 (Year: 2009).

Google AI, "laser shaping a metal" pp. 17, 2025, downloaded from https://www.google.com/search?q=laser+shaping+a+metal &sca_esv=a5a0522d64990aca&sxsrf=AE3TifNgcMI69kQxdaUXF6Q1rcQIINxa7w%3A1765683149899&source=hp&ei=zS8-ad6QNdrep84P3c7zsQU&iflsig (Year: 2025).

* cited by examiner 2
1
3
1
2'

PLANNING METHOD FOR PROCESSING A 2D ELEMENT INTO A 3D FINAL ELEMENT

CROSS-REFERENCE TO RELATED APPLICATIONS

This application is the National Stage of International Patent Application No. PCT/DK2021/050223, filed Jul. 2, 2021, which claims the benefit of Danish Patent Application Number PA 2020 70454, filed Jul. 2, 2020. The disclosures of the foregoing applications are incorporated herein by reference in their entireties for any and all purposes.

FIELD OF THE INVENTION

The present invention relates to a computer implemented method for planning a manufacturing process of a final element from an element, using laser means, such as planning a sequence of bending and forming processes to a metal element so as to manufacture a final metal element, using said laser means.

BACKGROUND OF THE INVENTION

Processing of elements, such as sheet metal, into a final element is currently done by a performing a plurality of processes, such as laser cutting, grinding, bending, drilling, milling, polishing, punching, hydroforming, engraving, marking, surface treating, incremental forming and forming the metal element, so as to create a final element which has undergone one or more of the above mentioned processes. When an element is subdued to one or more processes, the element is to be moved between a plurality of machines, such as a laser cutter, a milling machine and a bending machine. Having more machines in a shop requires more costs to maintain said machines and more operators, in order to have the required skills to set up and operate said machines, which further adds to costs and time consumption, to create a final element. Implementing or translating some or all of the above processes into a single laser device is a challenge, as this would require to calculate/foresee and hence create a complex plan, as to how an element is to be processed, in order to achieve a final element, wherein the sequence of processes does not inflict a process impediment, throughout said sequence of processes.

When attempting to replace all of the above processes with laser processes, one challenge is to figure out which processes should be done first or last in order to achieve the desired end result. A sequence of processes is to be made and the more complex the final element is, the more complex the sequencing method will become.

Hence, an improved method for planning said sequences would be advantageous, and in particular a more efficient and/or reliable computer implemented method would be advantageous.

OBJECT OF THE INVENTION

It is a further object of the present invention to provide an alternative to the prior art.

In particular, it may be seen as an object of the present invention to provide a computer implemented planning method that solves the above mentioned problems of the prior art with planning how to sequence the manufacturing of a final element from an element, such as planning a sequence of bending and forming processes to a metal element so as to manufacture a final metal element, using laser means.

SUMMARY OF THE INVENTION

In a first aspect, the invention relates to a computer-implemented method for planning a laser processing of one or more elements into one or more final elements, the method comprising:

- providing an element model of an element to be processed, said element model having at least a first surface,
- providing a final model of the final element,
- projecting the final model onto the first surface of the element model,
- determining a plurality of processing steps, the total number of processing steps being n, said processing steps comprising:
  - identifying a base structure of the element model,
  - identifying one or more processing structures of the element model,
  - optionally identifying one or more fixation structures of the element model,
  - identifying a plurality of connections between the base structure, the one or more processing structures, the one or more fixation structures, the fixation structures and any non-process sections of the element model,
  - identifying the laser processing to use, in order to process the element model into the final model, the laser processing comprising one or more of a laser cutting process, a laser bending process and a laser forming process, the total number of laser processes to be used being p,
  - generating laser process specifications for each of the laser processes p, and
- generating a first set of instructions for processing the element model into the final model, based on the plurality of processing steps n.

In the context of the present invention, laser processing is to be understood as an operation or treatment performed to the element, such as a metal element, so as to manufacture or create a final element different from a non-processed element, e.g. surface treating, colour treatment, drilling, case-hardening, shaping, bending, forming, cutting or welding said metal element. The laser processing is to be performed by a laser device or other laser means.

In the context of the present invention, a laser device or laser means is to be understood as an apparatus configured for generating a beam of coherent electromagnetic radiation usually in the ultraviolet, visible, or infrared regions of the spectrum, such as, but not limited to a fiber laser, a $CO_2$ laser, pulsed-rod laser, a solid-state laser, a disc laser, a diode laser or a UV laser. A laser comprises an energy source which is directed from the laser to a point of interest and in the context of the present invention, a vector is to be understood as the direction from which the laser origins, to a point at which the laser interacts with the metal element, which defines a directed line segment between the laser and the metal element.

In the context of the present invention, shaping is to be understood as applying energy to a surface of a metal element so as to create or form e.g. a double curved, a convex or concave shape in said metal element, through heat expansion/contraction of said metal element. As an example, by applying energy to said element in a continuously calculated pattern, the invention can create a desired indentation or depression into a surface of said metal element. In another example, the invention can create a cone shape into or out from said metal element, by applying energy to a surface of said metal element, so as to manipulate certain sections of the surface of said metal element, through energy applied to certain points of said surface of said metal element.

In the context of the present invention, cutting is to be understood as cutting into a surface so as to create a surface groove or cutting through a surface and creating a through-going groove or cutting a metal element into a plurality of metal elements. As an example, laser ablation can be used to create a hole in a surface, which resembles the hole of a manual drilling process.

In the context of the present invention, bending is to be understood as bending a section of the metal element at an angle, relative to an adjacent section of said metal element, such as by bending a sheet metal into a 90 degrees angle.

In the context of the present invention, the element is to be understood as a metal element, a polymer element, a fiber element, a ceramic element or an alloy element. The final element may further be manufactured from two or more elements, such as a metal element and a polymer element. Furthermore, more final elements may be manufactured from one or more elements, according to the invention. Further, a metal element is to be understood as any element comprising metal, such as, but not limited to, iron, lead, gold, aluminum, platinum, uranium, zinc, lithium, sodium, tin, silver, copper, brass, titanium, magnesium, steel, a galvanized metal or any metal alloy. As an example, a metal element could be a block or plate of copper or a sheet metal, such as a steel sheet metal element.

In an embodiment of the present invention, the element to be processed is heavy enough, that said element does not move during processing, in which, fixation structures may not be needed in order to keep the base structure still from movement.

In the context of the present invention, an element model is to be understood as a data file comprising e.g. geometric data, specifications, such as material information, surface colour, heat treatment and other relevant data regarding the element which is to be processed.

In the context of the present invention, the final model is to be understood as a list of instructions or file containing technical drawings, such as a CAD file of the final element, to be interpreted by a computer. In another embodiment of the invention, the final model may be provided by scanning and/or measuring an existing prototype/final element, which is to be manufactured from a provided element, using the method according to the first aspect of the invention.

In an embodiment of the invention, the following steps may be applied, to provide an element model and/or a final element model:

Import and analyse CAD data for an element or final element:

Import CAD geometry.

Detect the structures of the geometry.

Generate a graph, such as an undirected graph, describing the connections between structures of the final element geometry. Each structure is represented by a vertex or node and an edge represents the physical connection in a model, between two adjacent vertices.

Detect and convert manufacturing information:

Detect or obtain from the geometry which manufacturing processes are applied:

Unfold the CAD geometry to a planar sheet;

Convert the originally applied processes to laser processes, such as:

stamping, drilling, spark erosion, laser cutting, water jet cutting or others into laser cutting.

bending, folding, hydro forming, drawing or other processes into laser forming/shaping/bending.

arc welding, laser welding or other welding processes into laser welding.

If a final element is designed for laser processing, the conversion step can be skipped.

Add the information about applied processes to the edges of the graph that represent the connections between the adjacent vertices.

Project final model onto element model:

The unfolded final model is placed/overlain on the element model, which represents the element from which the final model will be made. The section of the element surrounding the final model is referred to as a the non-processed sections of the element and which are suitable as fixation structures. The non-processed element and fixation structures is used for fixation of the final element during manufacturing and the non-processed element is considered as an additional structure. Furthermore, micro joints along the cutting edges can be used to fixate the element during processing.

The graph is expanded with a new vertex for the additional structure, representing the non-processed sections of the element. New edges are inserted to connect the final model and the non-processed sections of the element. These edges are added with processing information describing how they are processed either from existing information regarding processing specifications or from analyses of required processes.

In the context of the present invention, a graph or undirected graph is to be understood as a structure consisting of vertices which are connected by edges. The graph is able to represent the geometrical structure of a part or structure.

In the context of the present invention, a vertex or more vertices are to be understood as a structure or base structure.

In the context of the present invention, projecting or projection is to be understood as applying a final model onto a model of an element, which is to be processed into a final element from an element. As an example, an unfolded 2-dimensional model of a 3-dimensional square box is projected onto a flat, or substantially flat metal plate, so as to identify which process steps to apply, in order to cut and bend the metal plate into said square box.

In the context of the present invention, a flat element is to be understood as an element having the major surfaces essentially parallel and distinctly greater than the minor surfaces.

In the context of the present invention, a base structure is to be understood as a central or substantially central part of the element model, which is connected to one or more other structures of the element, which are part of the final model, e.g. when creating a square box from a flat, or substantially flat metal plate the base structure may be the bottom portion and the processing structures may be the sides and top portion or lid of said square box. In most or all cases, the base structure is connected to the element during the processing of the final element from sections of the element, and wherein e.g. a processing structure can be cut free from the element, still connected to the base element, so that any stabilizing connection to said processing structures goes through the base structure. In some cases, the base structure is intermittently cut free from the element, generating a plurality of fixation structures along the cut edges of the base structures, while one or more processing structures are being processed. In an embodiment of the invention, the fixation structures may be edges or protrusions along the bottom portion of the base structure, which has not been cut or separated from the element, so as to fixate the base structure while bending or otherwise processing the base structure or processing structures to manufacture the final element.

In the context of the present invention, connections are be understood as non-cut parts of the element, such as an edge between the base structure and a processing structure and wherein said edge may either be cut or bend at a later stage of the process. Connections are further to be understood as any sections which may supply mechanical links between the element and/or the base plate and/or the processing structures and/or the fixation structures. Furthermore, edges may represent connections between faces or joints to itself if it represents internal structures. Edges can be cuts, welds and bends, such as single curved bends.

In the context of the present invention, non-processed is to be understood as any surface or section of the element which are not laser processed during the manufacturing of the final element from the element. As an example, when supplying a metal plate with a surface area larger than the surface area of the final model, the non-processed sections of the metal element are the residual metal plate, after the final element has been manufactured.

In the context of the present invention, laser process specifications are to be understood as quality requirements for performing any laser processes to complete the process steps.

Laser process specifications (quality requirements) are either read from an input geometry, such as a data file or requested from a database containing the necessary information. Laser process specifications are generated based on quality requirements for each of the laser processes. A lookup table may store the laser process specifications but one or more specifications may be subject to continuous or intermittent measurements during a laser process. Quality requirements for the laser processes may be one or more, but not limited to the following examples:

- Laser cutting:
  - Quality: top kerf width, bottom kerf width, striation roughness, burr length
- Laser bending:
  - Quality: bend radius, bend angle, outside set back, continuous/stepwise, microstructure, edge effects, surface colour, topology and hardness
- Laser forming/shaping:
  - Quality: curvature, tolerances, microstructure, surface colour, topology and hardness
- Laser welding:
  - Quality: penetration depth, face width, face height, hardness, cracks, pores In the context of the present invention, a set of instructions is to be understood as a sequence or order of connected series of processes and laser process specifications for each of said processes. As an example, a set of instructions may comprise a laser cutting process, a laser bending process and a laser welding process in that order, and laser process specifications for each of said process.

The invention is particularly, but not exclusively, advantageous for obtaining a computer-implemented method for calculating how to process at least one element, such as a metal element into one or more final elements using a single laser device and thus, by implementing the invention in an existing laser device, replacing a plurality of processing machines, such as, but not limited to, a bending or forming machine, a milling machine, a drilling machine, a grinding machine and a cutting machine. Using a single machine for performing all of the abovementioned processes saves time, is more efficient and increases the accuracy of the performed processes. It is to be understood that two or more final elements may be manufactured from one or more metal elements or one or more metal elements and elements from a material different from metal. Further, it is to be understood that by calculating the method for processing an element, such as a metal plate, into a complex 3-dimensional final element, without shadowing the laser device from completing the process. As an example, when bending several sections of a base element, the order of process steps should be organized, so that no previous process step is completed if a subsequent process step is prevented from said previous process step. In this context, the present invention is particularly advantageous for proposing an order of process steps which can be completed.

In another advantageous embodiment of the invention, the method may comprise calculating/proposing to an operator, to cut one or more processing windows in a section of the non-completed element, so as to enable the laser device to reach into a section of said non-completed element, which would otherwise be shadowed/screened from further processing. In the context of the present invention, the term for creating a structure which blocks the laser device from having access to process other structures, is referenced as shadowing and is to be understood as screening, blocking, obscuring or otherwise preventing the processing means from reaching the point of processing.

The surface treatment of a final element is to be understood as a thermal heating process of either an outer surface layer or deeper into a layer of the material, from which the final element is processed. This embodiment is advantageous for creating a wear-resistant or weather-resistant surface of a final element, after a shaping, bending, forming or welding process by surface processing the element, such as by surface processing a metal element.

Furthermore, the invention is advantageous for forming, cutting and bending at least one metal element, so as to bend a section of the metal element towards a second section of the metal element and create a final element, e.g. a substantially square box, a rounded, donut shaped element, a rotor blade. The invention is particularly advantageous for creating interlocked elements, such as by cutting a protruding element in a first section of the metal element, and cutting a corresponding hole in a second section of the metal element and bending the first or second section in order for the protruding element to abut to or be bent through the hole. For further interlocking the protruding element with the hole, the protruding element, when inserted through the hole, can be bent or welded on a backside of the second section of the metal element.

In an advantageous embodiment of the invention, the method further comprises providing measuring means for measuring one or more of the base structures, the processing structures or the fixation structures during the processing of the element into the final element, and generating at least a second set of instructions from the measurements provided by the measuring means.

In the context of the present invention, measuring means is to be understood as means for measuring one or more geometries, densities and features of the metal element, e.g. a line scanner, a 3D scanner or 3D measuring device, an ultrasound device, an X-ray device, time of flight, a scattered light/structured light sensor, a 2D scanner, 1D scanner/point sensor, a CCD sensor system or a tactile measuring system.

In other embodiments of the invention, the measuring means may further comprise other sensors, such as a temperature sensor for supplying thermal data from a section or surface of the element being processed.

This embodiment of the invention is particularly advantageous for supplying continuous or intermittent measurement data regarding the current laser process performed to a section or structure of the element to be processed.

In another advantageous embodiment of the invention, wherein two or more base structures are identified, the method further comprises:

selecting a primary base structure from the two or more identified base structures, the primary base structure being selected from the following set of rules:

a. the primary base structure must have a connection to the metal element during at least n−1 processing steps, b. the primary base structure must be a base structure which enables all of the n−1 processing steps, and if the primary base structure does not satisfy the rules a or b, a new primary base structure must be selected from the identified base structures.

In yet another advantageous embodiment of the invention, the set of rules for selecting a primary base structure further comprises one or more of:

c. selecting the base structure closest to the centre of the first surface of the element, d. selecting the base structure with the highest number of directly adjacent processing and fixation structures, e. selecting the base structure which, when the element has been processed into the final element, provides a largest possible, connected surface area of the non-processed section of the element, f. selecting the base structure with the highest number of adjacent fixation structures, g. selecting the base structure with the lowest number of adjacent fixation structures, and determining the at least first set of instructions based on the selected base structure.

Examples of how to select a primary base structure from one or more viable base structures are listed below:

Locate all feasible primary base structures of the element. The localisation of the primary base structure can be done by the following steps:

Eliminate unfeasible base structures according to e.g. laser process specifications and geometrical constraints.

Examples of constraints are:

The primary base structure (vertex) should have one or more edges, made with cutting, which are connected to the element:

Constraint (geometrical): The primary base structure must have an edge to the element to be processed.

Constraint (geometrical): The one or more edges between the primary base structure and the element should have a sufficient physical length to keep the base structure sufficiently fixed during processing. The necessary length of the edge rim is dependent on e.g. the geometrical size of the part, material and material thickness.

Constraint (process): The edge has to contain cutting as a processing step in order to be able to free the final element from the element or fixation structure.

Joints between structures may render a primary base structure unsuitable as the selected primary base structure as it may be difficult or impossible to complete one or more joints due to process structures geometrically physically blocking or shadowing access to subsequent processing steps:

Constraint (geometrical): A joint on a primary base structure edge must not be blocked or made difficult to access by any other processed structures, when any subsequent processing steps are to be completed before finalizing the final element.

Among the feasible primary base structures, select one preferred primary base structure based on a set of optimisation rules.

Examples of optimisation rules are:

A part with equally distributed processing structures, fixation structures, area or laser processes around the base face is preferred:

Find the primary base structure centred in the element model.

Find the primary base structure with the highest number of adjacent processing or fixation structures.

A primary base structure that provides process stability is preferred

Find the primary base structure with the largest area or the primary base structure that spans over the largest area.

In the context of the present invention, spanning is to be understood as the area covered between the outer corners but where e.g. cut-outs clears away large areas.

In some cases, e.g. if all process structures on the rim of the primary base structure are bend according to each other, the criteria for selecting the primary base structure is different and the fixation structures proposed in planning steps can be different by using tensioning structures. Modify the planned processing steps according to the selected primary base structure.

When a primary base structure is selected, the following rules may be applied in order to plan the subsequent processing steps:

Modify cuts on the rim of the fixation plate:

Modify the cut on the rim between the final element model and the element model according to the selected primary base structure. The intent is to free certain structures by cutting in order to release them for further processing. Other cuts should be postponed to a subsequent processing step, in order to keep the final element fixed during processing.

Cut edges in the graph, which represents not physically connected cuts, are split up into edges that represents physically connected cuts, i.e. cuts on the rim of a face should each have an individual edge because the same edge cannot consist of two or more not connected cuts A bent edge should be cut free over the entire bend section in order to bend freely and this may be done the following way:

Start- and endpoints of cuts are moved along the cut line so they are located outside the rounded area of the bend zone making the bends able to be shaped freely without constraints.

Identify cutting edges, which can be joined to a continuous cutting path and thereby free other structures, different from the primary base structure, from the fixation plate. This generates the following proceeding constrains:

The one or more cuts that frees the structures, except for the primary base structure, should be located in the first task group to be processed. This frees the structure from constraints for further processing.

The one or more cuts that frees the primary base structure should be located in the last task group to be processed. This keeps the final element fixed, as this last cutting process will render the final element free from the non-processed element.

In another advantageous embodiment a fixation device may, during the processing steps fixate one or more structures of the element to be processed. If so, the final element may be cut free from the element at an earlier process step.

Update the processing steps to represent the modifications of the cuts.

Define the order of the processing steps to optimise:

For each closed cutting edge, specify possible start locations and corresponding end locations. Schedule start locations using a single- or multi-objective optimisation function. Optimisation parameters may include minimisation of time for intertask movements and minimisation of the number of reorientations of the part or the laser device.

In the context of the present invention, intertask is to be understood as the step between two or more subsequent process steps and wherein said two or more processing steps may be rearranged in order to reduce risk of shadowing of a subsequent laser process step or in order to achieve time optimisation.

Identification of Proceeding Constraints:

Analyse the process step dependencies that specify disjunctive proceeding constraints and allowed time windows.

Examples of constraints are:

Keep the final element and/or the primary base structure stable and fixed during processing. This implies that the part will not vibrate and/or move during processing.

Constraint: cut inner structures before outer structures to avoid loosening the final element from the element. This is especially important when cutting with a gas nozzle, where the gas pressure applies pressure to the element and final element.

Constraint: start a bend early in the sequence of group tasks in order to stiffen the final element during further processes and to ensure that the bend forms optimally, to avoid correcting processes.

Bend and form tasks should be done within the time window determined by a desired temperature window for the material to be processed.

Constraint: Each laser forming and bending line should be done within an allowed temperature and/or time window in order to form as planned and achieve the expected material properties, such as metallurgical properties.

Some processes need to be done before others:

Constraint: All cuts with a gas nozzle on an element, such as a plane sheet metal, should be done first, if possible without rendering a subsequent process impossible.

Constraint: Most cutting needs to be done first, followed by bending and welding. However, the order of processing steps depends on the final element model, which needs to be analysed.

If welding needs to be performed, the relevant structures need to be in position, ready to be welded:

Constraint: Before welding surfaces or edges of structures together, the structures need to be positioned and faced correctly together. Facing may be done in a traditional weld joint method as butt-, corner-, T-, lab- and edge-joint or in a tab-joint.

Identification of Process Feasibility Constraints:

Check the geometry for processing feasibility.

Constraint are as follows:

Avoid unfeasible processing directions:

Constraint: Do not process where the laser points upwards (safety and cleanness of optics).

Constraint: Do not process when there is a risk of back reflection of the laser from the element, which can damage the laser and other equipment.

Identification of Accessibility Constraints:

Check the geometry for accessibility for the processing tool and the measurement tool.

Constraints are:

Sight of the tools should be possible

Constraint: The laser device should be able to reach the processing areas with the given process steps and laser process specification.

Constraint: The measuring means should be able to have visible access to the section to be measured.

If the above constraints are unsolvable, by repeating any abovementioned steps, the final element should be redesigned.

Solve the Scheduling Problem:

Apply existing optimisation or heuristics algorithm to solve the problem.

Place fixation structures and include it in the processing steps:

Place fixations structures to keep at least the base structure and or other structures stable during processing and determine when every fixation structure needs to be cut free from the element. Additionally, specify the degrees of freedom, stretch length, rigidity, torsional and tensional properties and other suitable requirements to the fixation structure.

Generate Set of Instructions and CAD Data:

Generate set of instructions and CAD data for each processing step and export the information. The CAD data may be in a form of STL or other kind of a meshed surface or such as an .amf, .stp, .iges, .obj or .dwg file.

In the context of the present invention, scheduling is to be understood as the sequence of processes to be performed in order to process the element into the final element.

In an embodiment of the invention wherein the final model of the final element is a 3-dimensional structure, the method further comprises:

generating an unfolded planar model of the final model, and projecting the planar model onto the first surface of the element model.

In a preferred embodiment of the invention, the laser processing further comprising a laser welding process and the method further comprises:

identifying any laser welding processes, so as to weld one or more of the base structure, the one or more processing structures and the one or more fixation structures to each other, during the laser processing steps p.

This embodiment is particularly advantageous for joining one or more structures of the final element to each other.

In another preferred embodiment of the invention, the method further comprises:

providing a process conversion table, said process conversion table comprising conversion methods for substituting traditional processing methods into laser processing methods and wherein a traditional processing plan for the final model can be converted into the laser processing steps p, for processing the element model into the final element, by laser processing.

This embodiment of the invention is advantageous for fast and reliable conversion of existing processes, so as to ensure a finished product which correspond to or is superior to a product manufactured from present processing methods.

In another embodiment of the invention, the method further comprises:

providing a temperature table, said temperature table comprising data for heat accumulated in the metal element during the laser processes p, said heat being accumulated based on exposure time and an energy provided, from one or more laser processes p, to a section of the element.

In an advantageous embodiment of the invention, the method further comprises:

providing temperature measuring means, providing an upper and lower temperature threshold, ut and lt respectively, for the element to be processed, measuring at least a first temperature of a section of the element being laser processed, and generating laser process specification p, to process the element into the final element, the temperature of the section of the element being laser processed, being lower than ut and greater than lt during the laser processing, and generating a set of instructions for processing the element into the final element.

This embodiment of the invention is advantageous for continuous process control, ensuring that a material, such as a metal is kept within temperature tolerances advantageous for obtaining the desired characteristics of the material of the final element.

In another preferred embodiment of the invention further comprising at least a second element and in which the first element and the second element is to be processed into the final element, the method further comprises:

providing a second element model of the second element to be processed, said second element model having at least a first surface, providing a final model of the final element, projecting the final model onto the first surface of the first element model and the first surface of the second element model, determining a plurality of processing steps, the total number of processing steps being n, said processing steps comprising:

identifying a base structure of the first element model, and/or identifying a base structure of the second element model, identifying one or more processing structures of the first element model and the second element model, identifying one or more fixation structures of the first element model and the second element model, identifying any connections between the one or more base structures, the one or more processing structures, the one or more fixation structures and any non-process sections of the first element model and the second element model, identifying the laser processing to use, in order to process the first element model and the second element model into the final model of the final element comprising one or more of a laser cutting process, a laser bending process and a laser forming process, the total number of laser processes to be used being p, generating laser process specifications for each of the laser processes p, and generating a first set of instructions for processing the first element model and the second element model into the final model, based on the plurality of processing steps n.

This embodiment of the invention is particularly advantageous for manufacturing a complex final element comprising two or more materials, such as a metal shape lined with a polymer.

In another advantageous embodiment of the invention, the method further comprises:

providing adjustment means for adjusting the position of the one or more elements to be laser processed, identifying one or more base structure of the one or more models of the one or more elements further based on adjusting the one or more elements, and generating the at least first set of instructions, for processing the one or more models of the one or more elements into the final model of the final element, said one or more set of instructions being generated by determining a plurality of processing steps n, said processing steps further including adjusting the one or more elements during said laser processing.

This embodiment is particularly advantageous for creating complex final elements, which otherwise would provide shadowing of one or more sections of the element relative to a vector of the laser means. By adjusting the element with the automatic positioning means, the laser means has better access to a plurality of section of said element. As an example, the automatic positioning means may be a robotic arm with a gripping device, for gripping the element.

In yet another embodiment of the invention wherein the method further comprises a final model of a final element, wherein one or more structures of the final model are interlocked, the method further comprises:

determining a plurality of processing steps n according to any of the preceding claims, said processing steps further comprising:

determining a laser cutting process of a section of the first processing structure being connected to the base structure, determining a laser cutting process of a section of a second processing structure being connected to the base structure or the first processing structure, determining a bending process of the first or second processing structure, and determining an interlocking process between the first processing structure and the second processing structure, or determining an interlocking process between the first processing structure and the base structure, or determining an interlocking process between the second processing structure and the base structure, and wherein the interlocking process comprises laser bending, laser forming or laser welding a section of the first processing structure, to interlock with a section of the second processing structure or laser bending, laser forming or laser welding a section of the first or second processing structure to interlock with the base structure.

This embodiment of the invention is advantageous for planning and designing interlocking sections of the metal element, so as to improve the stability and rigidity of the final model.

In another embodiment of the invention, the at least first set of instructions is configured, to be provided to an associated laser processing device, so as to enable said associated laser processing device to process the one or more elements into the one or more final elements from the one or more models of the one or more elements and the final model of the final element, by executing said at least first set of instructions.

This embodiment is advantageous for providing the invention to an array of existing laser processing devices, such as for retrofitting a laser device with the method according to the first aspect of the invention.

In another preferred embodiment of the invention, the method further comprises providing a surface analysis, said surface analysis comprising a backscatter analysis of the one or more surfaces of the element. The surface analysis may be performed prior to the processing of the element or during, either on-line or intermittently.

In the context of the present invention, backscatter is to be understood as any deviation from expected light being reflected back in the direction from which it came, such as an expected reflection from a metal surface and wherein said backscatter may be converted into a map of the surface, said map comprising reflective information relating to all relevant areas of said surface. In other embodiments, the surface may comprise one or more of ceramics, paint or coatings, natural materials, such as wood or paper.

In an embodiment, a laser scanner may be used to measure the backscatter intensity from the laser line. As colours are a representation of the light, that is reflected from the surface in a given wavelength. The reflected wavelengths may be used to obtain an indication of the colour of the scanned surface. However, in this case, the purpose is not to obtain the colour of the surface, but to locally estimate the amount of absorbed and reflected light from the surface. The result can be represented as an image or map of the scanned surface, where the greyscale pixel intensities in an image corresponds to the amount of absorbed and reflected light. The shinier the surface, the more light is reflected and the brighter the surface will appear in the image.

When analyzing the surface, the wavelength of the laser light, used for scanning, should be close to the same wavelength as the laser used for processing, due to some surfaces reflecting different wavelengths of light. The same applies for the angle at which the laser is projected and subsequently captured on the surface, as this will also influence the result.

This embodiment of the invention, is particularly advantageous for analyzing the surfaces of the element, so as to correct or adjust for any surface defects or any contaminations, so as to ensure that the energy from the laser device, intended for processing said (metal element) is not scattered or reflected from the surface, and hence create instructions and/or process steps which correct for said surface defects or contaminations.

In the context of the present invention, defects or surface defects is to be understood as, but not limited to dents, scratches, protrusions, notches, cracks, cuts, wear, corrosion, etching, tarnish, fading, peel off or flake off and crevices or other not desired damages to the surface.

In the context of the present invention, contaminations is to be understood as, but not limited to oil, grease, hairs, dust, dirt, extraction, spillage, soot, moisture, process remains or other polluting particles present on a surface or impurities within said surface.

In a further embodiment, the surface analysis can be combined with a geometrical analysis of the element, such as a 2-D or 3-D geometrical analysis.

In yet another embodiment, the surface analysis may be used to preprocess any surfaces which may have defects or contamination.

The measuring means and the surface analysis means may be a single device, configured to provide geometrical data and surface data relating to the metal element and providing said data for processing of the element by using the laser supplied from the laser means intended for processing of the element, wherein the surface analysis is performed by using low power level settings on said laser means and a sensor for measuring the reflected backscatter In a second aspect, the present invention relates to a computer program product comprising software code adapted to control a laser processing device, when executed on a data processing system, to process one or more elements into one or more final elements from one or more models of the one or more elements and one or more final models of the one or more final elements, by executing at least a first set of instructions, the computer program product being adapted to perform the method according to the first aspect of the invention.

This embodiment is advantageous for providing a computer program product, which may be adapted to an existing laser processing device, so as to increase the processing features of said existing laser device.

In a third aspect, the present invention relates to a device for laser processing a metal element into a final element, said device comprising:

data processing means input/output means, measuring means, laser processing means, optional fixture and/or position adjustment means, the device being adapted to perform the method according the first aspect of the invention.

The fixture and/or positioning means may comprise a robotic gripper, or other suitable mechanical/electric/pneumatic fixture mechanism.

In an embodiment of the invention, the position adjustment means may further comprise a conveyor belt, the method further comprising transporting one or more elements into a processing cell for processing said element into one or more final elements, and optionally transporting the final element out from the processing cell.

This embodiment is particularly advantageous for processing a plurality of elements, which are fed through a laser cell, so as to mass-produce a type of final element, saving time and reducing cost of the final elements. In other embodiments of the invention the transport mechanism for transporting an element into the processing cell may be a set of rollers, carts, wagons or coasters, suitable for transporting elements along a predetermined path.

In a fourth aspect, the invention relates to the use of a device according to the third aspect of the invention, for processing at least a first element into one or more final elements, according to the method set forth in the first aspect of the invention.

The first, second, third and fourth aspect of the present invention may each be combined with any of the other aspects. These and other aspects of the invention will be apparent from and elucidated with reference to the embodiments described hereinafter.

BRIEF DESCRIPTION OF THE FIGURES

The planning method according to the invention will now be described in more detail with regard to the accompanying figures. The figures show one way of implementing the present invention and is not to be construed as being limiting to other possible embodiments falling within the scope of the attached claim set.

FIG. 10 is a flow-chart of a method, according to an embodiment of the invention.

DETAILED DESCRIPTION OF AN EMBODIMENT

Figure 1:
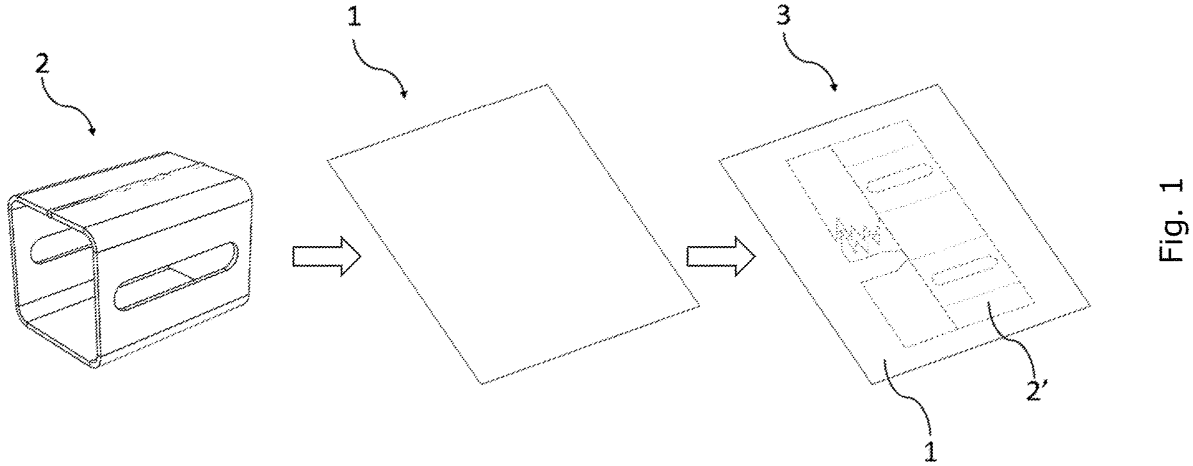
FIG. 1 shows a final element model projected onto an element model, according to an embodiment of the invention.

FIG. 1 illustrates an embodiment of a final element model 2 projected onto an element model 1 as a planar model 3, according to an embodiment of the invention. FIG. 1 illustrates, from left to right, a method of introducing a model of a final element 2 and a model of an element 1, from which a final element is to be manufactured, and wherein an unfolded planar model 2' of the final element model 2 is projected 3 onto a surface of the element model 1. In another embodiment of the invention, the final element model 2 and/or the element model may be physical elements, which is geometrically analysed.

Figure 2:
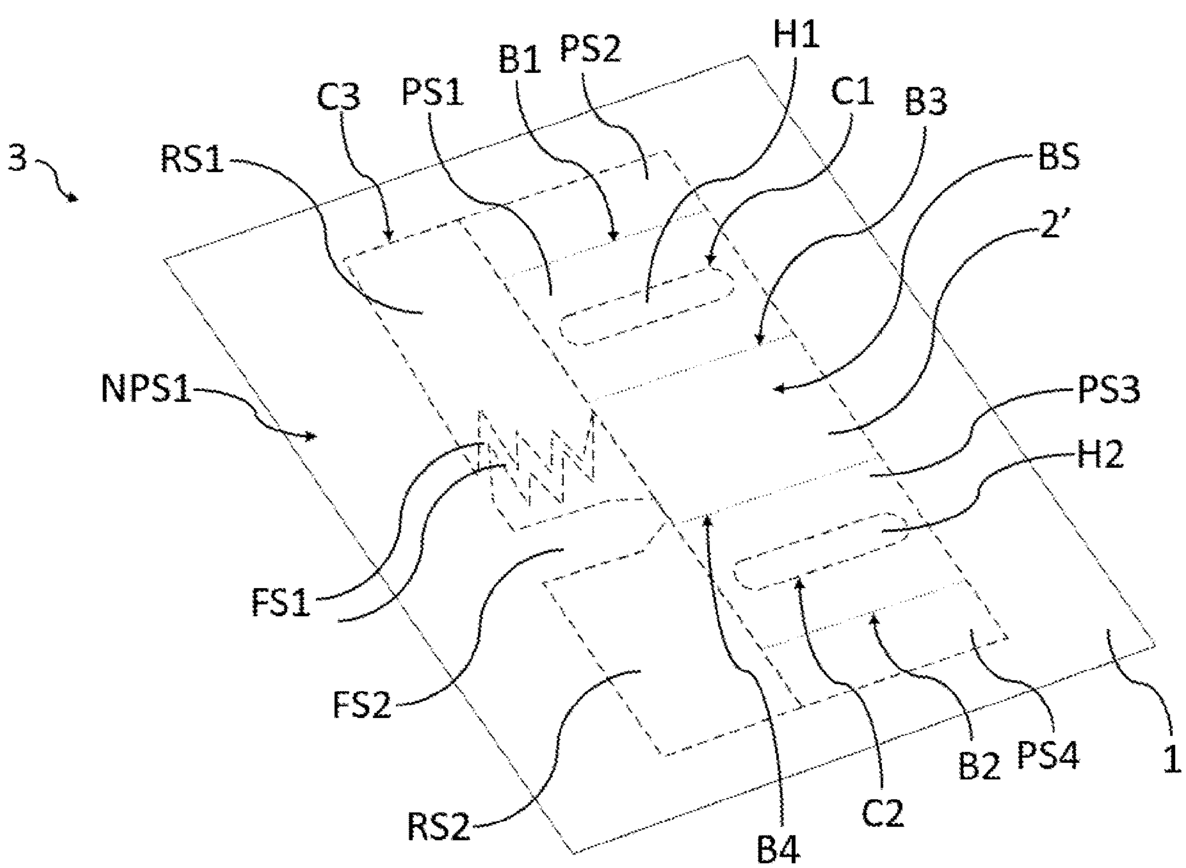
FIG. 2 shows an unfolded planar model of the final element model projected onto an element model, according to an embodiment of the invention.

FIG. 2 illustrates an embodiment of a planar model 3 of an unfolded planar model 2' of a final element model projected onto an element model 1. FIG. 2 illustrates how to cut and bend an element into a final element by dividing an element model 1 into a sequence of structures and processes. The projection shows a base structure BS, a plurality of processing structures, PS1 to PS4, a first and second hole H1, H2 cut by C1 and C2 from PS1 and PS3 respectively and two fixation structures FS1, FS2. When the final element model is cut at the cutting edge C3 from the element model 1, the two fixation structures FS1, FS2 provide support to the base structure BS. When cutting the final element model from the element model 1 by a connected cutting line C3, the largest residual connected area of the element model 1 is termed a non-processed section NPS1.

Furthermore, when creating the two fixation structures, two residual sections RS1, RS2 are created, which are not to be used for the further manufacturing of a final element. To manufacture a final element from an element, the unfolded planar model 2' has four bending lines B1 to B4, wherein bending line 1 B1 represents a bending edge between processing structure 1 PS1 and processing structure 2 PS2, bending line 2 B2 represents a bending edge between processing structure 3 PS3 and processing structure 4 PS4, bending line 3 B3 represents a bending edge between processing structure 1 PS1 and the base structure BS, and bending line 4 B4 represents a bending edge between processing structure 3 PS3 and the base structure BS. When all processing has been performed, the two fixation structures FS1, FS2 are cut from the base structure BS, freeing the final element from the non-processed section NPS1 of the element.

Figure 3:
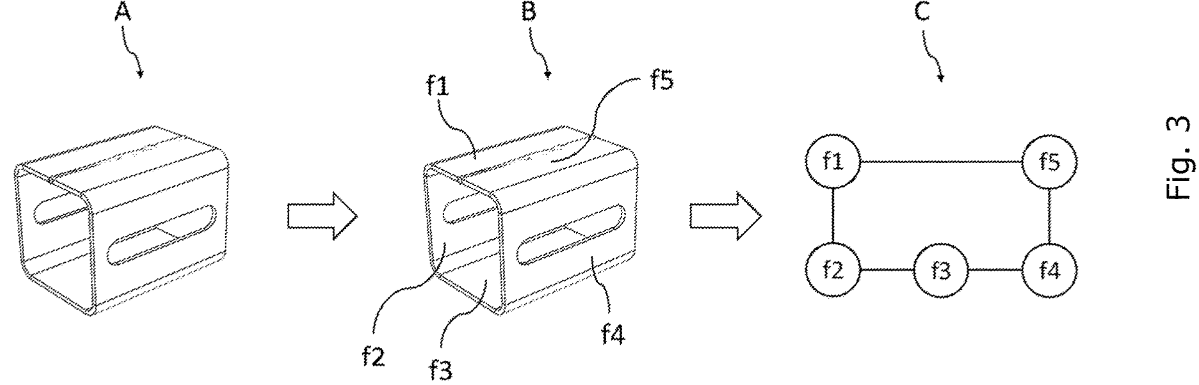
FIG. 3 shows a final element converted into a final element model which is further converted into an undirected graph of the structures of said final element model, according to an embodiment of the invention.

FIG. 3 shows an embodiment of a final element A converted into a final element model B which is further converted into an undirected graph C of the identified structures f1 to f5 of said final element model B. The lines between the five structures f1 to f5 illustrates the connecting edges between said identified structures f1 to f5. In this particular embodiment, f3 is the base structure.

Figure 4:
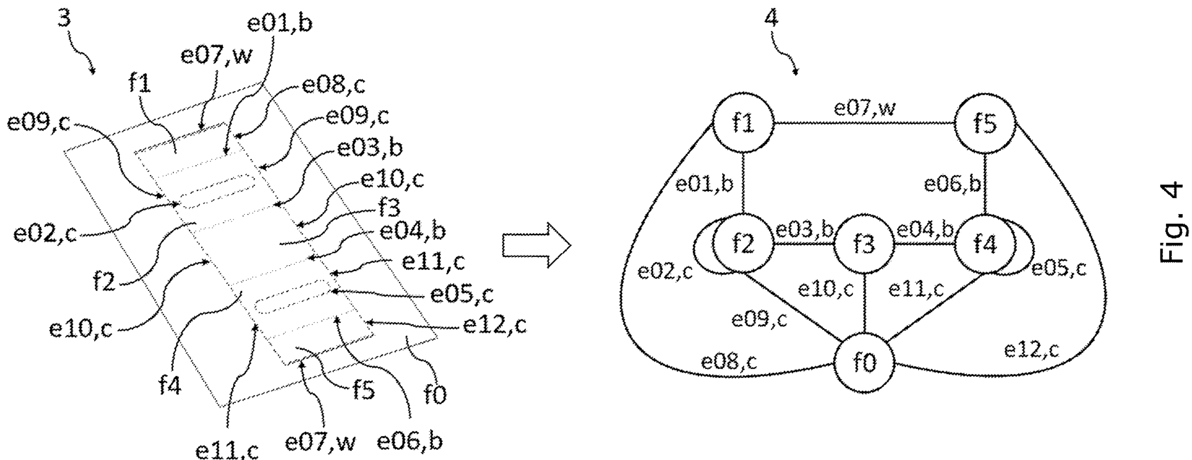
FIG. 4 shows a sequence of laser processes and connecting edges from a planar model converted into an undirected graph representation, according to an embodiment of the invention.

FIG. 4 shows an embodiment of a sequence of laser processes and connecting edges from a planar model 3 converted into an undirected graph 4 representation. On the left of FIG. 4, a planar model 3 is shown, in which all edges e01 to e12 between two or more structures f0 to f5 have been identified. The letter after each of the identified edges e01 to e12, indicates whether the edge is to be bend by b, welded by w or cut by c, e.g. e01, *b* is an edge which is to be bend, so as to bend f1 relative to f2 and e07, w represents the welding of two edges f5 and f1 after the bending sequences, bring the edges of f5 and f1 together. On the right, an undirected graph 4 illustrates the connecting edges e01 to e12 relative to the positions of the structures f0 to f5, and wherein the lines in between the structures f0 to f5 indicates that these structures are connected by edges e01 to e12, said edges e01 to e12 to be cut c, welded w or bent b. An example of an initial sequence for performing the laser processes, as determined by the planning method according to the invention, is listed below:

e01,*b*: Angle=90°, Radius=4°, bend face=front, . . .
e02,*c*: tkw=0.1 mm, cut face=front or back, . . .
e03,*b*: Angle=90°, Radius=4°, bend face=front, . . .
e04,*b*: Angle=90°, Radius=4°, bend face=front, . . .
e05,*c*: tkw=0.1 mm, cut face=front or back, . . .
e06,*b*: Angle=90°, Radius=4°, bend face=front, . . .
e07,*w*: Penetration=1 mm, weld face=front or back, . . .
e08,*c*: tkw=0.1 mm, cut face=front or back, . . .
e09,*c*: tkw=0.1 mm, cut face=front or back, . . .
e10,*c*: tkw=0.1 mm, cut face=front or back, . . .
e11,*c*: tkw=0.1 mm, cut face=front or back, . . .
e12,*c*: tkw=0.1 mm, cut face=front or back, . . . .

Wherein tkw is the width of the cut kerf of the beam as applied to the element at the surface and cut face options are whether or not there is access, without moving the final element during processing. It should be noted that the sequence above has not yet been optimized, so as to ensure that the correct sequence order has been obtained.

Figure 5:
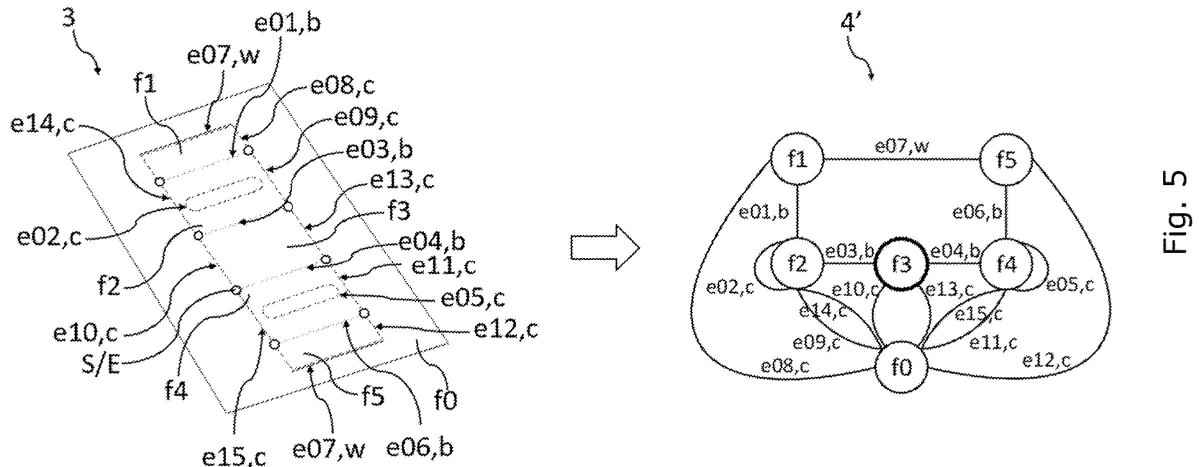
FIG. 5 shows an optimized sequence of laser processes and connecting edges from a planar model converted into an optimized undirected graph representation, according to an embodiment of the invention.

FIG. 5 shows an embodiment of an optimized sequence of laser processes and connecting edges from a planar model 3 converted into an optimized undirected graph 4' representation. On the left of FIG. 5, a planar model 3 is shown, in which all edges e01 to e15 between two or more structures f0 to f5 have been identified. The letter after each of the identified edges e01 to e15, indicates whether the edge is to be bend by b, welded by w or cut by c. On the right, an optimized undirected graph 4 illustrates the connecting edges e01 to e15 relative to the positions of the structures f0 to f5, and wherein the lines in between the structures f0 to f5 indicates that these structures are connected by edges e01 to e15, said edges e01 to e12 to be cut c, welded w or bent b.

Optimizing the sequencing, relative to FIG. 4:

Edge cut optimization:

e08,*c*+e09,*c*+e14,*c* becomes e09,*c* e11,*c*+e12,*c*+e15,*c* becomes e11,*c*

This gives the following cut sequence constraints:

e09,*c* and e11,*c* should be in the first group of tasks, e10,*c* and e13,*c* should be in the last group of task to free the part. An example of an optimized sequence for performing the laser processes, as determined by the planning method according to the invention, is listed below:

e09,*c*: tkw=0.1 mm, cut face=front or back, . . .

e11,*c*: tkw=0.1 mm, cut face=front or back, . . .

e01,*b*: Angle=90°, Radius=4°, bend face=front, . . .

e02,*c*: tkw=0.1 mm, cut face=front or back, . . .

e03,*b*: Angle=90°, Radius=4°, bend face=front, . . .

e04,*b*: Angle=90°, Radius=4°, bend face=front, . . .

e05,*c*: tkw=0.1 mm, cut face=front or back, . . .

e06,*b*: Angle=90°, Radius=4°, bend face=front, . . .

e07,*w*: Penetration=1 mm, weld face=front or back, . . .

e08,*c*: tkw=0.1 mm, cut face=front or back, . . .

e12,*c*: tkw=0.1 mm, cut face=front or back, . . .

e10,*c*: tkw=0.1 mm, cut face=front or back, . . .

e13,*c*: tkw=0.1 mm, cut face=front or back, . . . .

The circles S/E around the perimeter indicates possible starting or ending points during the laser cutting sequences.

Figure 6:
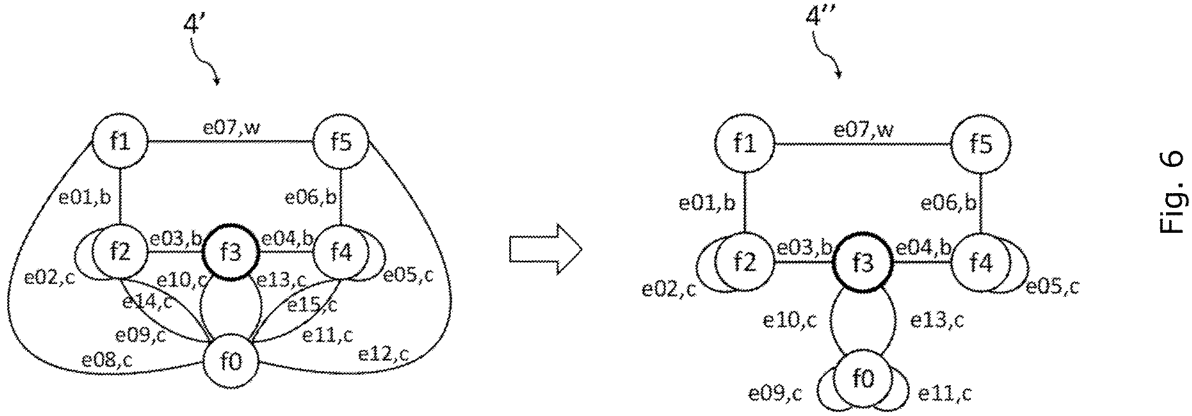
FIG. 6 shows a further optimization of an optimized undirected graph representation, according to an embodiment of the invention.

FIG. 6 shows an embodiment of a further optimization 4" of an optimized undirected graph 4' representation. On the right, the initial optimized undirected graph 4' is shown, with edges e01 to e015, according to FIG. 5. On the right, the further optimization of the graph 4" illustrates that e08,*c*+e09,*c*+e14,*c* have become e09,*c* and e11,*c*+e12,*c*+e15,*c* have become e11,*c* effectively optimizing the process of manufacturing a final element from an element.

Figure 7:
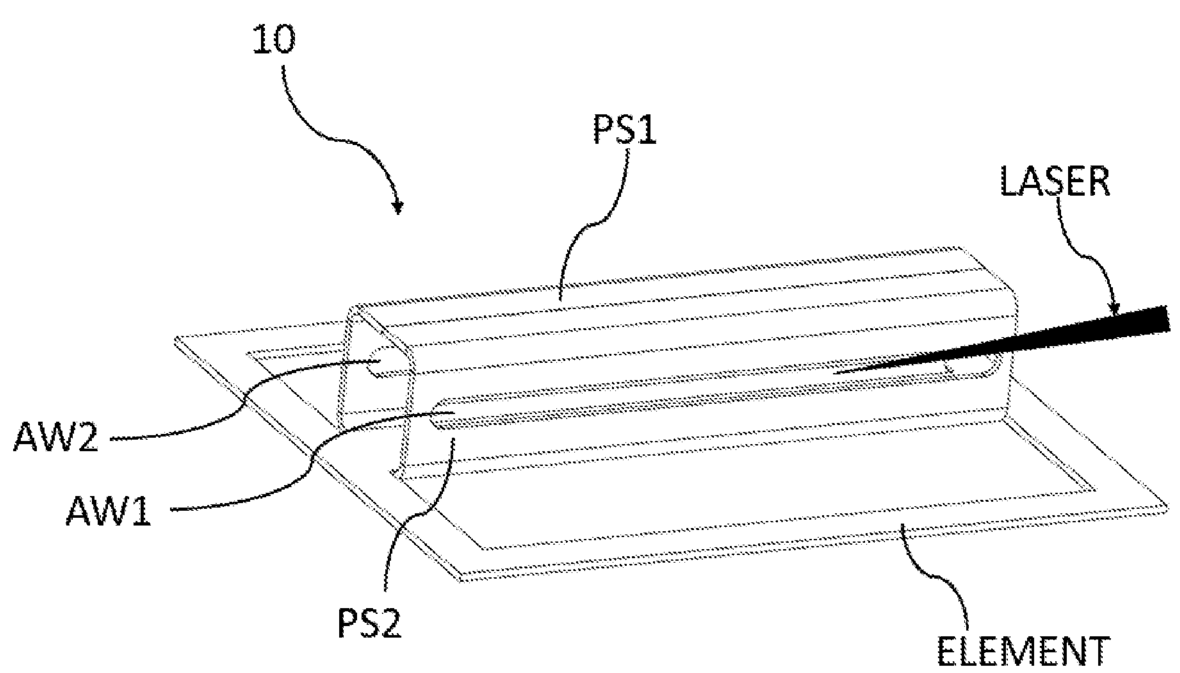
FIG. 7 shows a final element being manufactured from an element, according to an embodiment of the invention.

FIG. 7 shows an embodiment of a final element 10 being manufactured from an element ELEMENT. From the figure it is illustrated, how access windows AW1, AW2 have been cut in order for a laser beam LASER to gain access to a point within the final element 10, which would otherwise not be accessible for further processing after the two processing structures PS1, PS2 have been bent.

Figure 8:
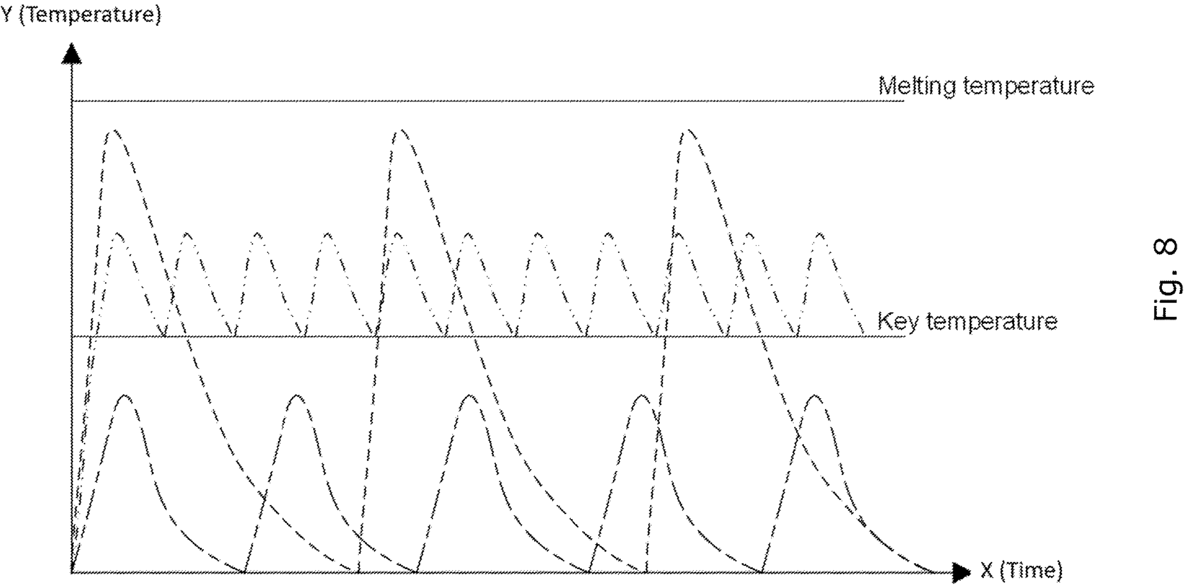
FIG. 8 shows a temperature representation for optimal processing of an element, according to an embodiment of the invention.

FIG. 8 shows a temperature representation for an embodiment of optimal processing of an element. The figure illustrates how pulses from a laser heats an element during processes, and is divided into three sections. The lower portion of the y-axis represents pulses at a low energy level, wherein the temperature of the element may be too low to obtain the desired effect within the element, such as bending a section of the element. The middle section indicates an optimal temperature, a key temperature, within the element and the upper section indicates a temperature, melting temperature, which may damage or inflict unwanted results.

Figure 9:
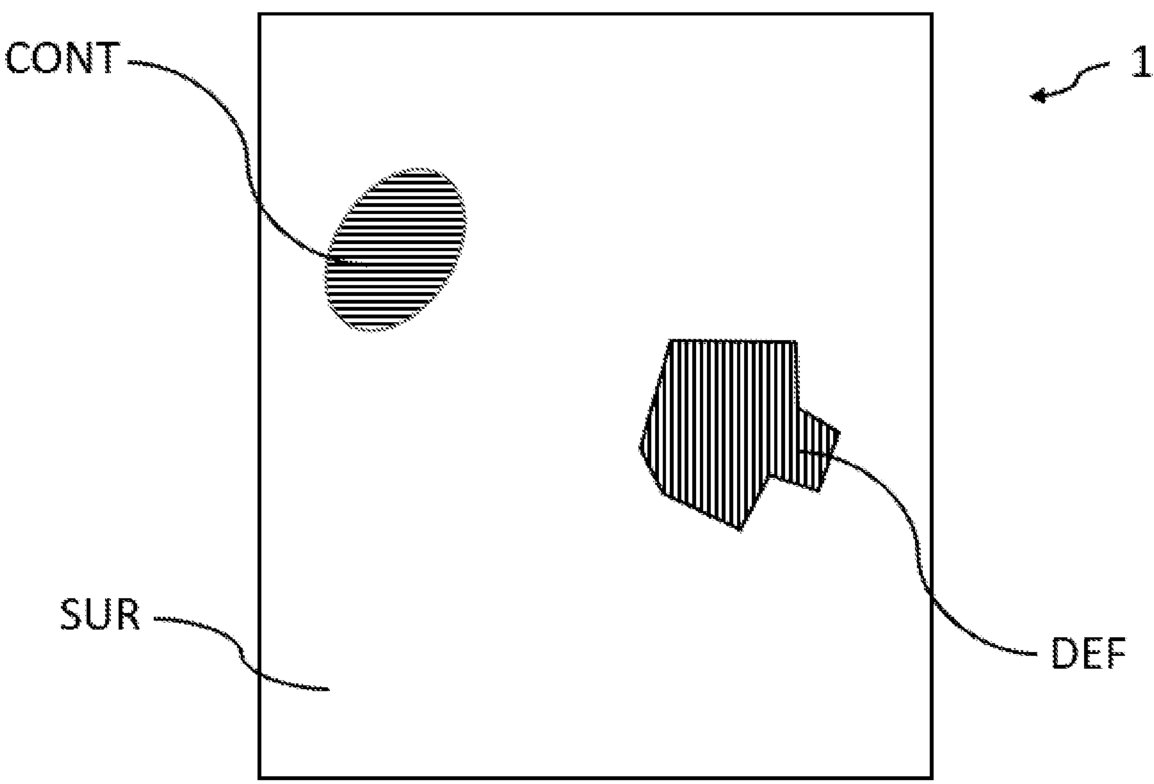
FIG. 9 show a surface analysis representation, according to an embodiment of the invention.

FIG. 9 shows an element 1 being analyzed for any surface defects or contamination. The figure shows a square, flat element 1 wherein the surface has been analyzed for backscatter, and wherein said surface has a first area SUR which has a uniform backscatter, a second area DEF which has a defect, such as scratch and a third area CONT which has been contaminated, such as by a fingerprint.

In an embodiment of the invention, the method corrects for said detected surface defects DEF and contaminations CONT, by adjusting the energy level for the laser device/means on said affected areas DEF, CONT, so as to attain the desired process of the element 1 in spite of said defect and/or contaminated areas DEF, CONT.

Figure 10:
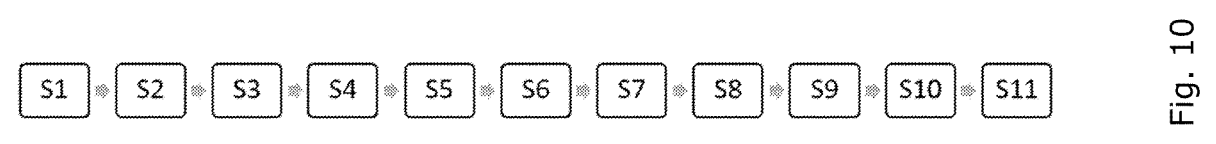

FIG. 10 is a flow-chart of a method embodiment according to the invention, comprising a computer-implemented method for planning a laser processing of one or more elements into one or more final elements, the method comprising:

S1—providing an element model of an element to be processed, said element model having at least a first surface, S2—providing a final model of the final element, S3—projecting the final model onto the first surface of the element model, S4—determining a plurality of processing steps, the total number of processing steps being n, said processing steps comprising:

S5—identifying a base structure of the element model,

S6—identifying one or more processing structures of the element model,

S7—optionally identifying one or more fixation structures of the element model, S8—identifying a plurality of connections between the base structure, the one or more processing structures, the one or more fixation structures, the fixation structures and any non-process sections of the element model, S9—identifying the laser processing to use, in order to process the element model into the final model, the laser processing comprising one or more of a laser cutting process, a laser bending process and a laser forming process, the total number of laser processes to be used being p, S10—generating laser process specifications for each of the laser processes p, and S11—generating a first set of instructions for processing the element model into the final model, based on the plurality of processing steps n.

Although the present invention has been described in connection with the specified embodiments, it should not be construed as being in any way limited to the presented examples. The scope of the present invention is set out by the accompanying claim set. In the context of the claims, the terms “comprising” or “comprises” do not exclude other possible elements or steps. Also, the mentioning of references such as “a” or “an” etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A computer-implemented method for planning laser processing of at least one metal element into at least one final element, the method comprising:

providing an element model of a metal element to be processed, wherein the element model has at least a first surface, providing a final model of the final element, projecting the final model onto the first surface of the element model, determining a plurality of processing steps, the total number of processing steps being n, wherein the processing steps comprise:

identifying a base structure of the element model, identifying at least one processing structure of the element model, identifying a plurality of connections between the base structure, the at least one processing structure and any non-process sections of the element model, identifying the laser processing to use, in order to process the element model into the final model, the laser processing comprising at least one of a laser cutting process, a laser bending process and a laser forming process, the total number of laser processes to be used being p, generating laser process specifications for each of the laser processes p, generating a first set of instructions for processing the element model into the final model, based on the plurality of processing steps n, providing a measuring device configured to measure at least one of the base structure, the at least one processing structure and a fixation structure during the processing of the metal element into the final element, and generating at least a second set of instructions from the measurements provided by the measuring device.

2. The method according to claim 1, the method further comprising:

identifying at least one fixation structure of the element model, and identifying a plurality of connections between the base structure, at least one processing structures, the at least one fixation structure and any non-process sections of the element model.

3. The method according to claim 1, wherein two or more base structures are identified, the method further comprising:

selecting a primary base structure from the two or more identified base structures, the primary base structure being selected from the following set of rules:

a. the primary base structure must have a connection to the metal element during at least n−1 processing steps, or b. the primary base structure must be a base structure which enables all of the n−1 processing steps, and if the primary base structure does not satisfy the rules a or b:

selecting a new primary base structure from the identified base structures.

4. The planning method according to claim 1, wherein two or more base structures are identified, the method further comprising:

selecting a primary base structure from the two or more identified base structures, the primary base structure being selected from the following set of rules:

c. selecting the base structure closest to a center of the first surface of the element, d. selecting the base structure with a highest number of directly adjacent processing and fixation structures, e. selecting the base structure which, when the metal element has been processed into the final element, provides a largest possible, connected surface area of the non-processed section of the element, f. selecting the base structure with a highest number of adjacent fixation structures, or g. selecting the base structure with a lowest number of adjacent fixation structures, and determining the first set of instructions based on the selected base structure.

5. The method according to claim 1, wherein the final model of the final element is a 3-dimensional structure, the method further comprising:

generating an unfolded planar model of the final model, and projecting the planar model onto the first surface of the element model.

6. The method according to claim 1, the laser processing further comprising a laser welding process and the method further comprises:

identifying any laser welding processes, so as to weld at least one of the base structure, the at least one processing structures and at least one fixation structure to each other, during the laser processing steps p.

7. The method according to claim 1, further comprising:

providing a temperature sensor, providing an upper and lower temperature threshold, ut and lt respectively, for the at least one metal element to be processed, measuring at least a first temperature of a section of the metal element being laser processed, and generating laser process specification p, to process the metal element into the final element, wherein the temperature of the section of the metal element being laser processed is lower than ut and greater than lt during the laser processing, and generating a set of instructions for processing the element into the final element.

8. The method according to claim 1, further comprising:

providing an adjustment device configured to adjust a position of the at least one element to be laser processed, identifying at least one base structure of the at least one model of the at least one element further based on adjusting the position of the at least one element, and generating the first set of instructions, for processing the at least one model of the at least one element into the final model of the final element, wherein the first set of instructions are generated by determining a plurality of processing steps n, the processing steps further including adjusting the at least one element during the laser processing.

9. The method according to claim 1, the method further comprising the final model of the final element, wherein at least one structure of the final model is interlocked with a second structure, the method comprising:

determining a plurality of processing steps n, the processing steps further comprising:

determining a laser cutting process of a section of a first processing structure being connected to the base structure of the final model, determining a laser cutting process of a section of a second processing structure being connected to at least one of the base structure and the first processing structure of the final model, determining a bending process of at least one of the first and second processing structure, and at least one of:

determining an interlocking process between the first processing structure and the second processing structure, and determining an interlocking process between the first processing structure and the base structure, and determining an interlocking process between the second processing structure and the base structure, wherein the interlocking process comprises at least one of:

interlocking by at least one of laser bending, laser forming and laser welding a section of the first processing structure, to interlock
with a section of the second processing structure, and
interlocking by at least one of laser bending, laser forming, laser
welding a section of the first or second processing structure to interlock with the base structure.

10. The method according to claim 1, wherein the first set of instructions is configured to be provided to an associated laser processing device with a processor, so as to enable the associated laser processing device to process the at least one element into the at least one final element from the at least one model of the at least one element and the final model of the final element, by executing the first set of instructions on the processor of the associated laser processing device.

11. The method according to claim 1, wherein the method further comprises providing a surface analysis, the surface analysis comprising a backscatter analysis of at least one surface of the metal element.

12. A non-transitory computer-readable storage medium configured to control a processor to perform a computer program code comprising instructions arranged to control a laser processing device, when executed on a data processing system, to process at least one metal element into at least one final element from at least one model of the element(s) and final model(s) of the final element(s), by executing at least a first set of instructions, the computer program code being adapted to perform the method according to claim 1.

13. A device for laser processing a metal element into a final element, the device comprising:

a data processor, an input/output device, a measuring device, a laser, wherein the device is adapted to perform the method according to claim 1.

14. The device according to claim 13, further comprising a fixture mechanism adapted to fixate the metal element during laser processing.

15. The device according to claim 13, further comprising a position adjustment mechanism adapted to adjust a position of the metal element during laser processing.

16. A computer-implemented method for planning laser processing of at least one metal element into at least one final element, the method comprising:

providing an element model of a metal element to be processed, wherein the element model has at least a first surface, providing a final model of the final element, projecting the final model onto the first surface of the element model, determining a plurality of processing steps, the total number of processing steps being n, wherein the processing steps comprise:

identifying a base structure of the element model, identifying at least one processing structure of the element model, identifying a plurality of connections between the base structure, the at least one processing structure and any non-process sections of the element model, identifying the laser processing to use, in order to process the element model into the final model, the laser processing comprising at least one of a laser cutting process, a laser bending process and a laser forming process, the total number of laser processes to be used being p, generating laser process specifications for each of the laser processes p, generating a first set of instructions for processing the element model into the final model, based on the plurality of processing steps n, and providing a process conversion table, the process conversion table comprising conversion methods to substitute traditional processing methods into laser processing methods and wherein a traditional processing plan for the final model can be converted into the laser processing steps p, for processing the element model into the final element, by laser processing.

* * * * *